J. B. WILLIAMSON.
Combined Tape Measure and Spring Scale.
No. 230,592. Patented July 27, 1880.
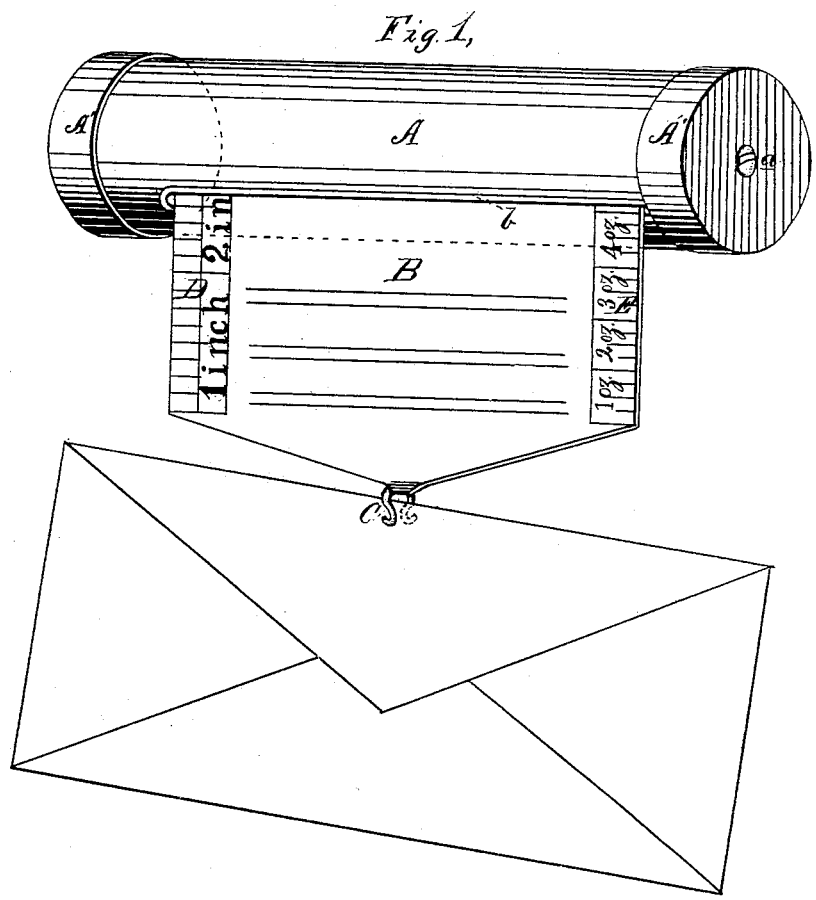
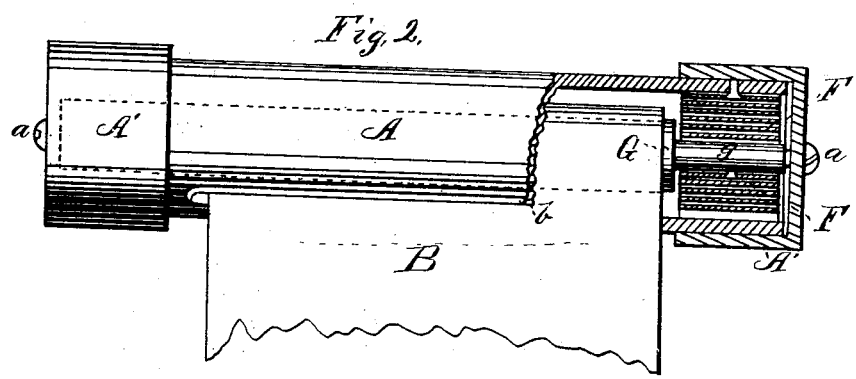
WITNESSES
INVENTOR
Jno. B. Williamson,
By E. W. Johnson & Co.,
ATTORNEYS.

UNITED STATES PATENT OFFICE.

JOHN B. WILLIAMSON, OF LOUISVILLE, KENTUCKY.

COMBINED TAPE-MEASURE AND SPRING-SCALE.

SPECIFICATION forming part of Letters Patent No. 230,592, dated July 27, 1880.

Application filed February 18, 1880.

*To all whom it may concern:*

Be it known that I, JOHN B. WILLIAMSON, a citizen of the United States, residing at Louisville, in the county of Jefferson and State of Kentucky, have invented certain new and useful Improvements in Measuring and Advertising Devices, of which the following is a specification.

This invention relates to certain new and useful improvements in advertising and measuring devices; and it consists in providing a scroll upon which are printed advertisements, such as fire-alarm stations, calendars, business notices, &c., and scales both for weighing and measuring small articles; also, in providing one end of said scroll with a device for holding articles to be weighed, and also in providing a case with a spring, in which case the scroll is contained, as will be hereinafter more fully set forth, and pointed out in the claim.

On the annexed drawings, Figure 1 is a perspective view of my invention, showing the scroll partly withdrawn from the case; and Fig. 2 is a side view of the same with the case broken away, so as to show the spring, shaft, &c.

A represents a slotted cylindrical case, which is provided on both ends with caps A' A', through which pass screws $a$ $a$, which hold the shaft G in place. The shaft G is reduced in diameter at the end $g$, to which portion of the shaft the spring F is attached. The spring F is secured to the casing A and shaft G at its reduced portion $g$, as shown, and is of sufficient strength and length to retract the scroll within the casing. The spring F is graduated, so as to correspond with the scale E, for weighing, upon the scroll B. The scroll B is of any flexible material, and upon it is printed a scale of inches or other desirable measuring-scale, D, and a weighing-scale, E, while in the center I print such matter of utility as fancy may suggest, as business advertisements, calendars, list of fire-alarm stations, &c.

One end of the scroll B is secured to the shaft G by any suitable means. and the other end is provided with a suitable device for holding small articles. This may be a hook, C, of the shape shown. This same device forms a ready means of withdrawing the scroll from its case, and also prevents it being drawn within the slot $b$ by the spring.

I am aware that heretofore tape-measures with inches printed thereon have been provided with a spring for drawing the same within a case, and I therefore lay no claim to such invention; but

What I claim as new, and desire to secure by Letters Patent, is—

The slotted cylinder A, with shaft G and spring F, in combination with the scroll B, with weighing and measuring scales printed thereon, and hook C, arranged substantially as shown, and for the purposes set forth.

In testimony that I claim the above I have hereunto subscribed my name in the presence of two witnesses.

JNO. B. WILLIAMSON.

Witnesses:
W. N. PATTESON,
I. S. GALLAGHER.